US010392193B2

(12) United States Patent
Walker et al.

(10) Patent No.: US 10,392,193 B2
(45) Date of Patent: Aug. 27, 2019

(54) CHAIN CONVEYOR LINK

(71) Applicant: Joy MM Delaware, Inc., Wilmington, DE (US)

(72) Inventors: Aaron Philip Walker, Evans City, PA (US); Christopher George Stewart, Oil City, PA (US)

(73) Assignee: Joy Global Underground Mining LLC, Warrendale, PA (US)

( * ) Notice: Subject to any disclaimer, the term of this patent is extended or adjusted under 35 U.S.C. 154(b) by 0 days.

(21) Appl. No.: 15/913,834

(22) Filed: Mar. 6, 2018

(65) Prior Publication Data

US 2018/0251313 A1 Sep. 6, 2018

Related U.S. Application Data

(60) Provisional application No. 62/467,761, filed on Mar. 6, 2017, provisional application No. 62/467,766, filed
(Continued)

(51) Int. Cl.
*B65G 17/06* (2006.01)
*B65G 19/24* (2006.01)
(Continued)

(52) U.S. Cl.
CPC ............. *B65G 19/20* (2013.01); *B65G 17/06* (2013.01); *B65G 17/26* (2013.01); *B65G 17/40* (2013.01);
(Continued)

(58) Field of Classification Search
CPC ........ B65G 17/00; B65G 17/08; B65G 19/04; B65G 19/20; B65G 19/28; B65G 19/26
(Continued)

(56) References Cited

U.S. PATENT DOCUMENTS 231,186 A 8/1880 Neacy
572,991 A 12/1896 Howard
(Continued)

FOREIGN PATENT DOCUMENTS

CN 1044627 8/1990
CN 2211981 11/1995
(Continued)

OTHER PUBLICATIONS

Bureau of Mines United States Department of the Interior, "Noise Study of Longwall Mining Systems", Jan. 1986, Contract JO188072, Wyole Laboratories, cover page, p. 3, pp. 131-137 (9 pages).
(Continued)

*Primary Examiner* — James R Bidwell
(74) *Attorney, Agent, or Firm* — Michael Best & Friedrich LLP

(57) ABSTRACT

A linkage for moving material from a first end of a conveyor toward a second end of the conveyor includes a first link and a second link. The first link includes a first side edge and a first indicator. The second link includes a second side edge and a second indicator. The second link is coupled to the first link such that the first side edge of the first link overlaps with the second side edge of the second link. Elongation of the first link in the direction of movement causes the first indicator to move relative to the second indicator, and a position of the first indicator relative to the second indicator provides an indication of a wear condition of the first link. In some aspects, a first surface and/or a second surface of one of the links includes a wear indicator representing a surface wear condition.

21 Claims, 9 Drawing Sheets

Related U.S. Application Data on Mar. 6, 2017, provisional application No. 62/467,767, filed on Mar. 6, 2017, provisional application No. 62/467,769, filed on Mar. 6, 2017, provisional application No. 62/467,770, filed on Mar. 6, 2017, provisional application No. 62/467,773, filed on Mar. 6, 2017.

(51) Int. Cl.

| | |
|---|---|
| ***B65G 19/20*** | (2006.01) |
| ***B65G 17/40*** | (2006.01) |
| ***E21C 35/20*** | (2006.01) |
| ***B65G 21/20*** | (2006.01) |
| ***B65G 19/18*** | (2006.01) |
| ***E21F 13/06*** | (2006.01) |
| ***B65G 17/44*** | (2006.01) |
| ***B65G 19/08*** | (2006.01) |
| ***B65G 23/06*** | (2006.01) |
| ***B65G 17/26*** | (2006.01) |
| ***B65G 21/12*** | (2006.01) |
| ***E21C 25/34*** | (2006.01) |
| ***E21C 31/06*** | (2006.01) |
| ***B65G 23/08*** | (2006.01) |
| ***B65G 23/22*** | (2006.01) |
| *B65G 19/26* | (2006.01) |
| *B65G 19/22* | (2006.01) |
| *E21C 31/12* | (2006.01) |
| *B65G 17/38* | (2006.01) |

(52) U.S. Cl.

CPC ............. *B65G 17/44* (2013.01); *B65G 19/08* (2013.01); *B65G 19/18* (2013.01); *B65G 19/205* (2013.01); *B65G 19/24* (2013.01); *B65G 21/12* (2013.01); *B65G 21/2045* (2013.01); *B65G 23/06* (2013.01); *B65G 23/08* (2013.01); *B65G 23/22* (2013.01); *E21C 25/34* (2013.01); *E21C 31/06* (2013.01); *E21C 35/20* (2013.01); *E21F 13/066* (2013.01); *B65G 17/38* (2013.01); *B65G 19/22* (2013.01); *B65G 19/26* (2013.01); *B65G 2201/045* (2013.01); *B65G 2207/48* (2013.01); *B65G 2812/0295* (2013.01); *B65G 2812/0297* (2013.01); *E21C 31/12* (2013.01)

(58) Field of Classification Search

USPC .................................. 198/850–853, 725–733

See application file for complete search history.

(56) References Cited

U.S. PATENT DOCUMENTS

| | | | | |
|---|---|---|---|---|
| 708,924 | A | 9/1902 | Scott et al. | |
| 1,008,890 | A | 11/1911 | Demarest | |
| 1,020,863 | A | 3/1912 | Weichseldorfer | |
| 1,153,375 | A | 9/1915 | Elliott | |
| 1,427,229 | A | 8/1922 | Robbins et al. | |
| 1,699,334 | A | 1/1929 | Petersen | |
| 1,869,050 | A | 7/1932 | Coppage | |
| 2,222,025 | A | 11/1940 | Fischer | |
| 2,386,619 | A | 10/1945 | Long et al. | |
| 2,450,501 | A | 10/1948 | Clarkson | |
| 2,674,365 | A | 4/1954 | Russell | |
| 2,754,957 | A | 7/1956 | Dodson | |
| 2,761,548 | A | 9/1956 | Long | |
| 2,784,836 | A | 3/1957 | Tourneau | |
| 3,005,358 | A | 10/1961 | Gandrud | |
| 3,103,275 | A | 9/1963 | Rollins | |
| 3,119,276 | A | 1/1964 | Pearson | |
| 3,145,576 | A | 8/1964 | Proctor | |
| 3,225,897 | A | 12/1965 | Rollins | |
| 3,324,990 | A | 6/1967 | Karlovsky, Jr. | |
| 3,452,228 | A | 6/1969 | Woolley | |
| 3,540,566 | A | 11/1970 | Perry et al. | |
| 3,602,364 | A | 8/1971 | Maglio et al. | |
| 4,037,713 | A | 7/1977 | Soliman et al. | |
| 4,175,797 | A | 11/1979 | Krekeler | |
| 4,202,219 | A | 5/1980 | Weis | |
| 4,218,932 | A | 8/1980 | McComber | |
| 4,238,028 | A | 12/1980 | Lake | |
| 4,461,372 | A | 7/1984 | Bekkala et al. | |
| 4,585,117 | A | 4/1986 | Hahn | |
| 4,766,995 | A | 8/1988 | Sterwerf, Jr. | |
| 4,844,314 | A | 4/1989 | Wilson, III | |
| 4,899,868 | A | 2/1990 | Johnson | |
| 4,917,658 | A | 4/1990 | Sugimoto et al. | |
| 4,964,344 | A | 10/1990 | Robinson | |
| 5,000,310 | A | 3/1991 | Edmondson | |
| 5,056,651 | A | 10/1991 | Nagamatsu | |
| 5,088,594 | A | 2/1992 | Edmondson | |
| 5,096,048 | A | 3/1992 | Lachner et al. | |
| 5,156,256 | A | 10/1992 | David | |
| 5,165,766 | A | 11/1992 | Thomas | |
| 5,177,949 | A | 1/1993 | Stadele et al. | |
| 5,186,526 | A | 2/1993 | Pennington | |
| 5,213,199 | A | 5/1993 | Braun et al. | |
| 5,226,526 | A | 7/1993 | O'Brien | |
| 5,305,872 | A | 4/1994 | Hutton | |
| 5,628,393 | A * | 5/1997 | Steeber | B65G 15/62 198/699.1 |
| 5,669,680 | A | 9/1997 | Bertoni | |
| 5,762,424 | A | 6/1998 | Harris et al. | |
| 6,640,534 | B1 | 11/2003 | Harnaes et al. | |
| 6,662,932 | B1 | 12/2003 | O'Neill | |
| 7,036,657 | B1 | 5/2006 | Robinson | |
| 7,118,648 | B2 | 10/2006 | Dever et al. | |
| 7,422,256 | B2 | 9/2008 | Mueller | |
| 7,438,180 | B1 | 10/2008 | Taylor et al. | |
| 7,442,139 | B2 | 10/2008 | Kubo et al. | |
| 7,997,402 | B2 | 8/2011 | Merten et al. | |
| 8,016,102 | B2 | 9/2011 | Morris | |
| 8,038,558 | B2 | 10/2011 | Klabisch et al. | |
| 8,141,696 | B2 | 3/2012 | O'Neill | |
| 8,177,049 | B2 | 5/2012 | O'Neill | |
| 8,360,912 | B2 | 1/2013 | Klabisch et al. | |
| 8,448,781 | B2 | 5/2013 | Morris | |
| 8,453,826 | B2 | 6/2013 | Morris | |
| 8,672,110 | B2 | 3/2014 | Jaeger | |
| 8,936,146 | B2 | 1/2015 | Morris | |
| 8,950,571 | B2 | 2/2015 | O'Neill | |
| 8,978,877 | B2 | 3/2015 | O'Neill | |
| 9,227,787 | B2 | 1/2016 | Morris et al. | |
| 9,284,124 | B2 | 3/2016 | Klingbeil | |
| 9,415,939 | B2 | 8/2016 | Arnold et al. | |
| 9,434,428 | B2 | 9/2016 | Hakes et al. | |
| 9,487,358 | B2 | 11/2016 | Morris et al. | |
| 10,106,325 | B2 | 10/2018 | Walker et al. | |
| 10,150,617 | B2 | 12/2018 | O'Neill | |
| 2002/0050442 | A1 * | 5/2002 | Malitzki | B65G 19/24 198/735.2 |
| 2002/0129732 | A1 | 9/2002 | Marshall | |
| 2004/0140182 | A1 | 7/2004 | Morris | |
| 2005/0176539 | A1 | 8/2005 | Hirschmann | |
| 2005/0274590 | A1 | 12/2005 | Kwiat | |
| 2005/0274590 | A1 | 12/2005 | Kwiat | |
| 2006/0058144 | A1 | 3/2006 | Lacerda | |
| 2006/0172841 | A1 | 8/2006 | Nunez et al. | |
| 2007/0107412 | A1 | 5/2007 | Humcke et al. | |
| 2008/0011588 | A1 | 1/2008 | Frost et al. | |
| 2009/0218199 | A1 | 9/2009 | Russell | |
| 2009/0250318 | A1 | 10/2009 | O'Neill | |
| 2009/0277757 | A1 * | 11/2009 | Boudreau | B65G 15/62 198/841 |
| 2009/0318239 | A1 | 12/2009 | Kampf | |
| 2010/0276254 | A1 | 11/2010 | O'Neill | |
| 2011/0067793 | A1 | 3/2011 | Nukushina | |
| 2011/0067980 | A1 | 3/2011 | Martin | |
| 2011/0088367 | A1 | 4/2011 | Powell et al. | |
| 2011/0315521 | A1 | 12/2011 | O'Neill | |
| 2012/0048684 | A1 | 3/2012 | Morris | |

(56) References Cited

U.S. PATENT DOCUMENTS

| | | | | |
|---|---|---|---|---|
| 2013/0203539 | A1 | 8/2013 | Kirchner et al. | |
| 2013/0227833 | A1 | 9/2013 | Rizzo | |
| 2013/0284569 | A1 | 10/2013 | Studer | |
| 2013/0334015 | A1 | 12/2013 | Lasecki | |
| 2014/0027247 | A1 | 1/2014 | Cox et al. | |
| 2014/0116850 | A1* | 5/2014 | Musick | B65G 17/086 198/617 |
| 2014/0239699 | A1 | 8/2014 | O'Neill | |
| 2014/0332354 | A1* | 11/2014 | Morris | B65G 19/08 198/852 |
| 2015/0008101 | A1* | 1/2015 | Miglavs | B65G 23/06 198/851 |
| 2015/0101912 | A1 | 4/2015 | Morris et al. | |
| 2015/0191313 | A1 | 7/2015 | Arnold et al. | |
| 2015/0266527 | A1 | 9/2015 | Akinlua et al. | |
| 2015/0353152 | A1 | 12/2015 | Hakes et al. | |
| 2016/0159417 | A1 | 6/2016 | Zimmer et al. | |
| 2016/0200520 | A1 | 7/2016 | Menke et al. | |
| 2017/0137226 | A1 | 5/2017 | Morris et al. | |

FOREIGN PATENT DOCUMENTS

| | | |
|---|---|---|
| CN | 1517280 | 8/2004 |
| CN | 201087012 | 7/2008 |
| CN | 101602433 | 12/2009 |
| CN | 101875433 | 11/2010 |
| DE | 3151059 | 7/1983 |
| DE | 19633298 | 2/1998 |
| DE | 20300239 | 3/2003 |
| EP | 1197671 | 4/2002 |
| EP | 2147875 | 1/2010 |
| EP | 2221495 | 8/2010 |
| EP | 2436944 | 4/2012 |
| GB | 205440 | 10/1923 |
| GB | 658623 | 10/1951 |
| GB | 671424 | 5/1952 |
| GB | 2458768 | 10/2009 |
| JP | 05576263 | 8/2014 |
| RU | 2064393 | 7/1996 |
| SU | 963922 | 10/1982 |
| WO | WO9008716 | 8/1990 |
| WO | WO03013987 | 2/2003 |
| WO | WO2012054775 | 4/2012 |

OTHER PUBLICATIONS

Leikin A. E., Rodin B.1., "Adhesive Materials", Material Sciences. M., High School, 1971, p. 405, http://www.nglib.ru/book_ view .jsp?idn=016470&page=405&format=free.

International Search Report with Written Opinion for Application No. PCT/US18/21230 dated May 24, 2018 (20 pages).

* cited by examiner

CHAIN CONVEYOR LINK

CROSS-REFERENCE TO RELATED APPLICATIONS

This application claims the benefit of prior-filed, U.S. Provisional Patent Application No. 62/467,761, filed Mar. 6, 2017; U.S. Provisional Patent Application No. 62/467,766, filed Mar. 6, 2017; U.S. Provisional Patent Application No. 62/467,767, filed Mar. 6, 2017; U.S. Provisional Patent Application No. 62/467,769, filed Mar. 6, 2017; U.S. Provisional Patent Application No. 62/467,770, filed Mar. 6, 2017; and U.S. Provisional Patent Application No. 62/467,773, filed Mar. 6, 2017. The entire contents of each of these documents are incorporated by reference herein.

BACKGROUND

The present disclosure relates to material conveyors, and particularly to chain and flight conveyors.

SUMMARY

In one independent aspect, a link assembly is provided for moving material in a direction of movement from a first end of a conveyor toward a second end of the conveyor, the link assembly includes a first link and a second link. The first link includes a first side edge positioned between a first end and a second end of the first link, and the first link further includes a first indicator. The second link includes a second side edge extending between a first end and a second end of the second link. The second link includes a second indicator. The second link is coupled to the first link such that the first side edge of the first link overlaps with the second side edge of the second link in a direction transverse to the direction of movement. Elongation of the first link in the direction of movement causes the first indicator to move relative to the second indicator, and a position of the first indicator relative to the second indicator provides an indication of a wear condition of the first link.

In another independent aspect, a linkage is provided for moving material in a direction from a first end of a conveyor toward a second end of the conveyor. The linkage includes a link including a first surface and a second surface opposite the first surface. The second surface is configured to slide relative to a support surface of the conveyor as the linkage moves from the first end of the conveyor toward the second end of the conveyor. At least one of the first surface and the second surface includes a wear indicator representing a surface wear condition of the at least one of the first surface and second surface.

Other aspects will become apparent by consideration of the detailed description and accompanying drawings.

DETAILED DESCRIPTION

Figure 1:
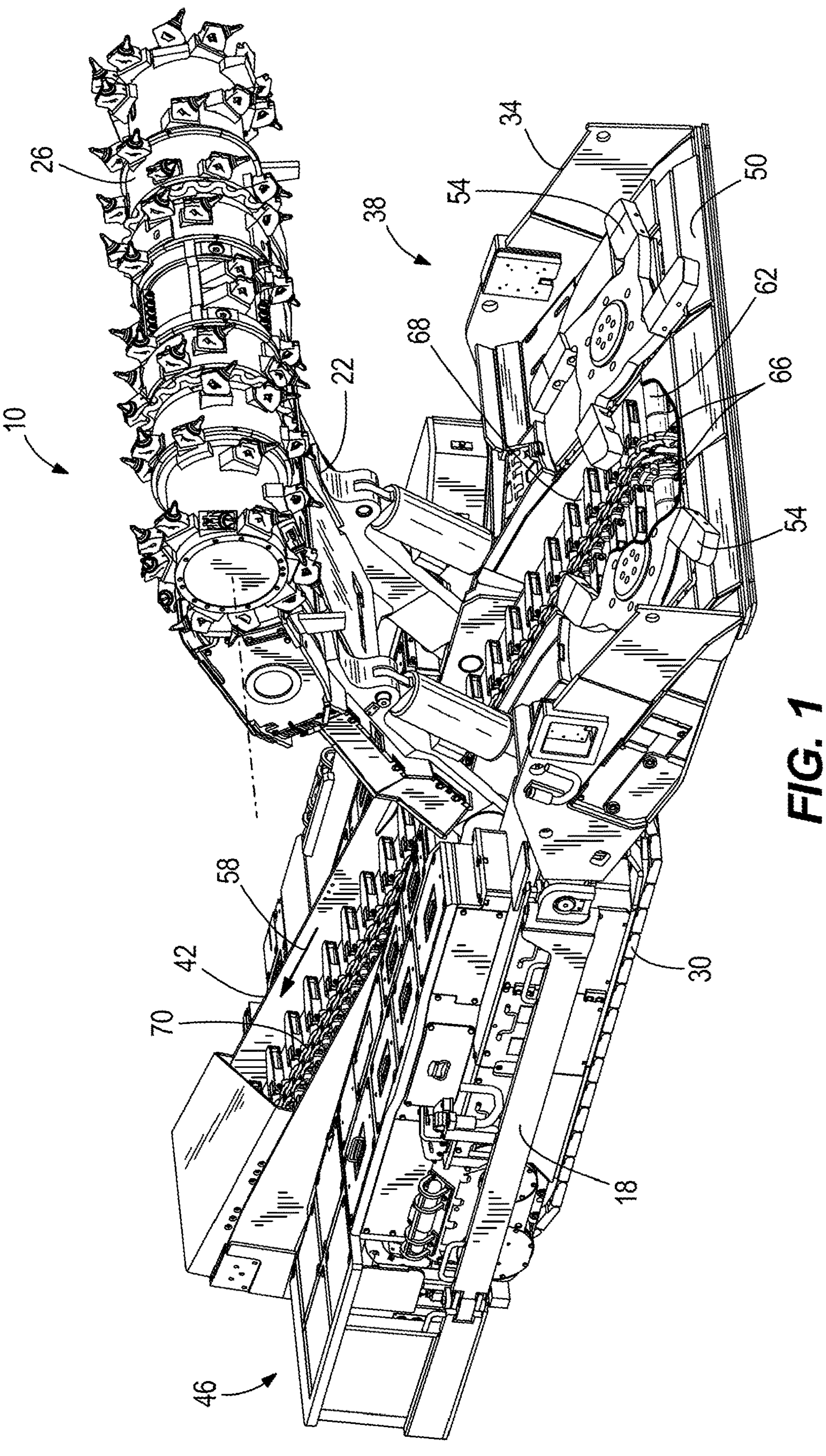
FIG. 1 is a perspective view of a mining machine including a conveyor having a chain and flight linkage according to an embodiment of the disclosure.

Before any independent embodiments of the disclosure is explained in detail, it is to be understood that the disclosure is not limited in its application to the details of the construction and the arrangements of components set forth in the following description or illustrated in the drawings. The disclosure is capable of other independent embodiments and of being practiced or being carried out in various ways. Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and can include electrical or fluid connections or couplings, whether direct or indirect.

FIG. 1 illustrates a mining machine 10, such as a continuous mining machine. In the illustrated embodiment, the mining machine 10 includes a frame or chassis 18, a boom 22 pivotably coupled to the chassis 18, and a cutter head 26 supported on the boom 22. The chassis 18 can be supported for movement relative to a support surface (not shown) by a traction mechanism (e.g., crawlers 30). The mining machine 10 also includes a collecting mechanism or gathering head 34 positioned adjacent a first end or forward end 38 of the chassis 18 and a conveyor 42 extending in a continuous loop from the forward end 38 of the chassis 18 toward a second or rear end 46 of the chassis 18. The gathering head 34 is positioned below the cutter head 26 and includes a deck 50 and a pair of rotating arms 54 that engage and direct dislodged material from a mine wall (not shown) onto the conveyor 42. The conveyor 42 transports the cut material from the forward end 38 toward the rear end 46 of the chassis 18 in a direction of travel 58. In other embodiments, the conveyor 42 can transport the cut material from the area below the cutter head 26 to another conveyor or to a haulage machine (not shown) positioned proximate the rear end 46 of the chassis 18.

With continued reference to FIG. 1, the conveyor 42 is a chain conveyor formed by chain links connected sequentially in a continuous loop. The conveyor 42 is driven by a shaft 62 positioned adjacent the gathering head 34 of the chassis 18. The shaft 62 is oriented laterally relative to the chassis 18 and is driven (e.g., by one or more motors) to rotate relative to the chassis 18. The shaft 62 includes a pair of sprockets 66 for engaging and moving the conveyor 42 along a conveyor surface 68 of the conveyor 42.

Figure 2:
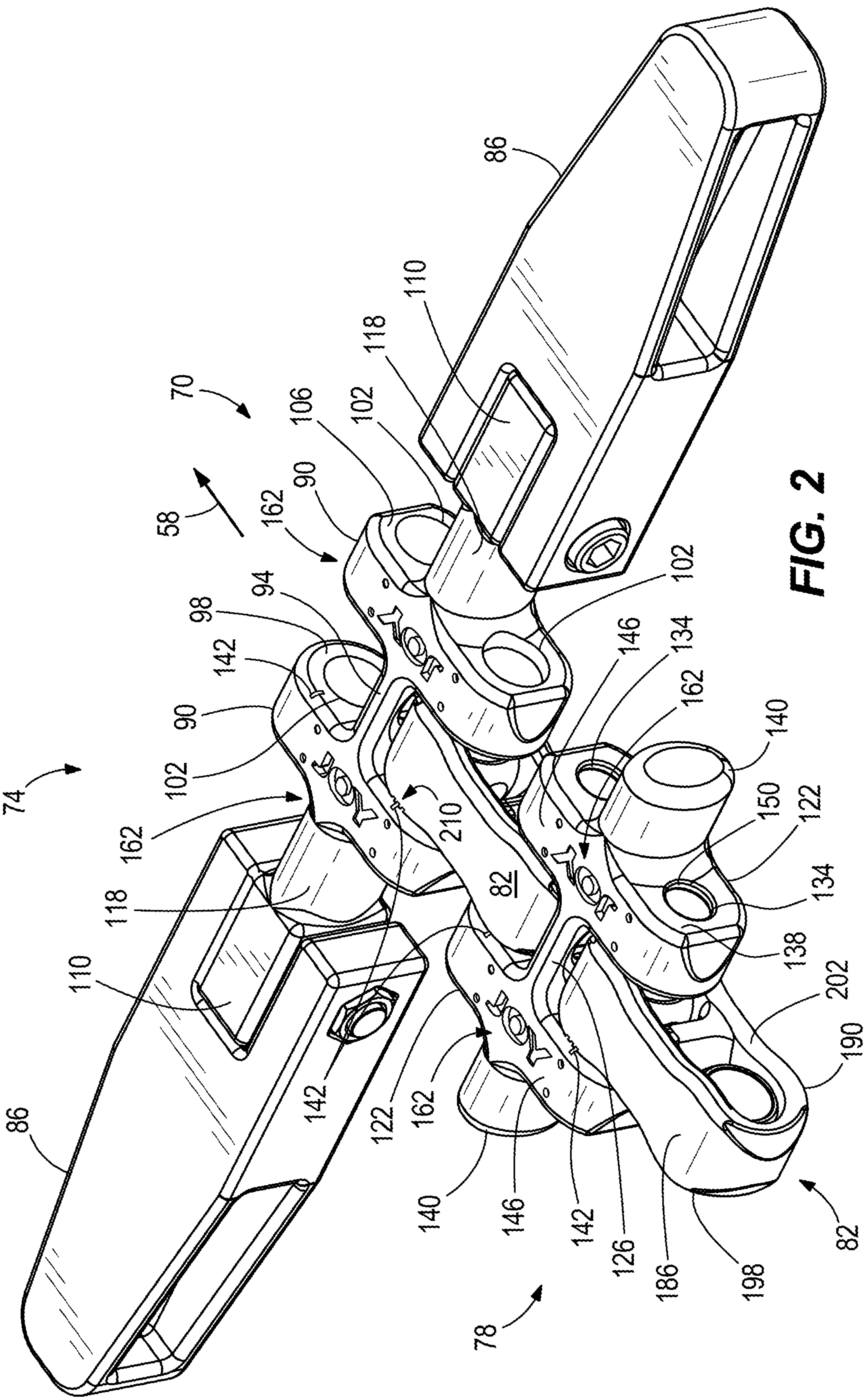
FIG. 2 is a perspective view of a portion of the chain and flight linkage of FIG. 1.
Figure 3:
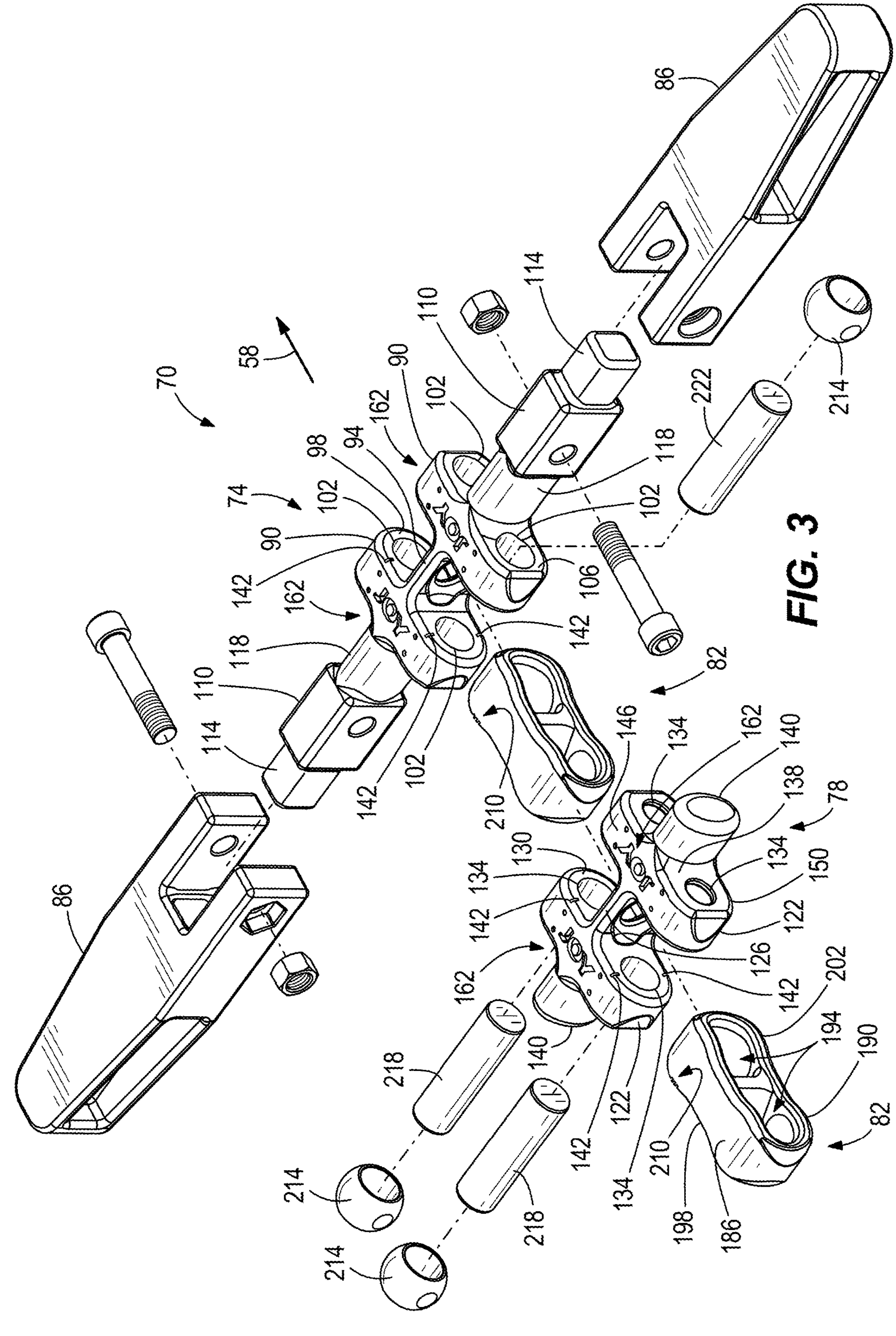
FIG. 3 is an exploded view of the portion of the chain and flight linkage of FIG. 2.

FIGS. 2 and 3 show a unit/segment of a chain 70 (e.g., chain and flight linkage) that partially forms the conveyor 42. The chain 70 includes a first link or flight link 74, a second link or connecting link 78, a coupler link or swivel link 82 coupling the flight link 74 to the connecting link 78, and flight bars 86 coupled to the flight link 74. In the illustrated embodiment, the flight link 74 includes a pair of side portions 90 and a bridge 94 connecting inner surfaces 98 of the side portions 90. Each side portion 90 includes a pair of apertures 102 extending through the inner surface 98 and an outer surface 106 of each side portion 90. The flight link 74 further includes a pair of flight pins 110, each flight pin 110 extending outwardly from the outer surface 106 of one of the side portions 90. Stated another way, each flight pin 110 extends laterally or transversely relative to the direction of travel 58 of the chain 70. Each flight bar 86 is removably coupled to an end portion 114 of one of the flight pins 110 (e.g., by a bolt and nut connection). A sprocket-engaging portion or drive portion 118 (e.g., protrusion) of each flight pin 110 is positioned between the end portion 114 and the side portion 90. As such, each flight link 74 is substantially an H-shaped link with the drive portions 118 and the flight pins 110 extending outwardly from the side portions 90. In the illustrated embodiment, the flight pins 110 are aligned with one another (i.e., along a common axis), and each of the flight pins 110 is positioned between chain pins 222 (described in further detail below).

Each connecting link 78 includes a pair of lugs or side portions 122 and a bridge portion 126 connecting inner surfaces 130 of the side portions 122. Each side portion 122 includes a pair of apertures 134 extending through the inner surface 130 and an outer surface 138 of each side portion 122. The connecting link 78 also includes a drive pin 140 (e.g., protrusion) extending outwardly from the outer surface 138 of each side portion 122. Stated another way, each drive pin 140 extends laterally or transversely relative to the direction of travel 58 of the chain 70. As such, in the illustrated embodiment, each connecting link 78 is substantially an H-shaped link with the drive pins 140 extending outwardly from the side portions 122. The sprockets 66 (FIG. 1) engage the drive pins 140 and the drive portions 118 of the flight pins 110 to drive the chain 70 in the direction of travel 58 along the conveyor surface 68.

With reference to FIG. 3, the flight link 74 and the connecting link 78 include witness marks or link indicators 142 formed into corresponding side portions 90, 122. As the link indicators 142 are the same between the flight link 74 and the connecting link 78, only the link indicators 142 relative to the connecting link 78 will be described in detail below. However, the link indicators 142 formed on the connecting link 78 can be equally applicable to the link indicators 142 formed on the flight link 74.

Figure 4:
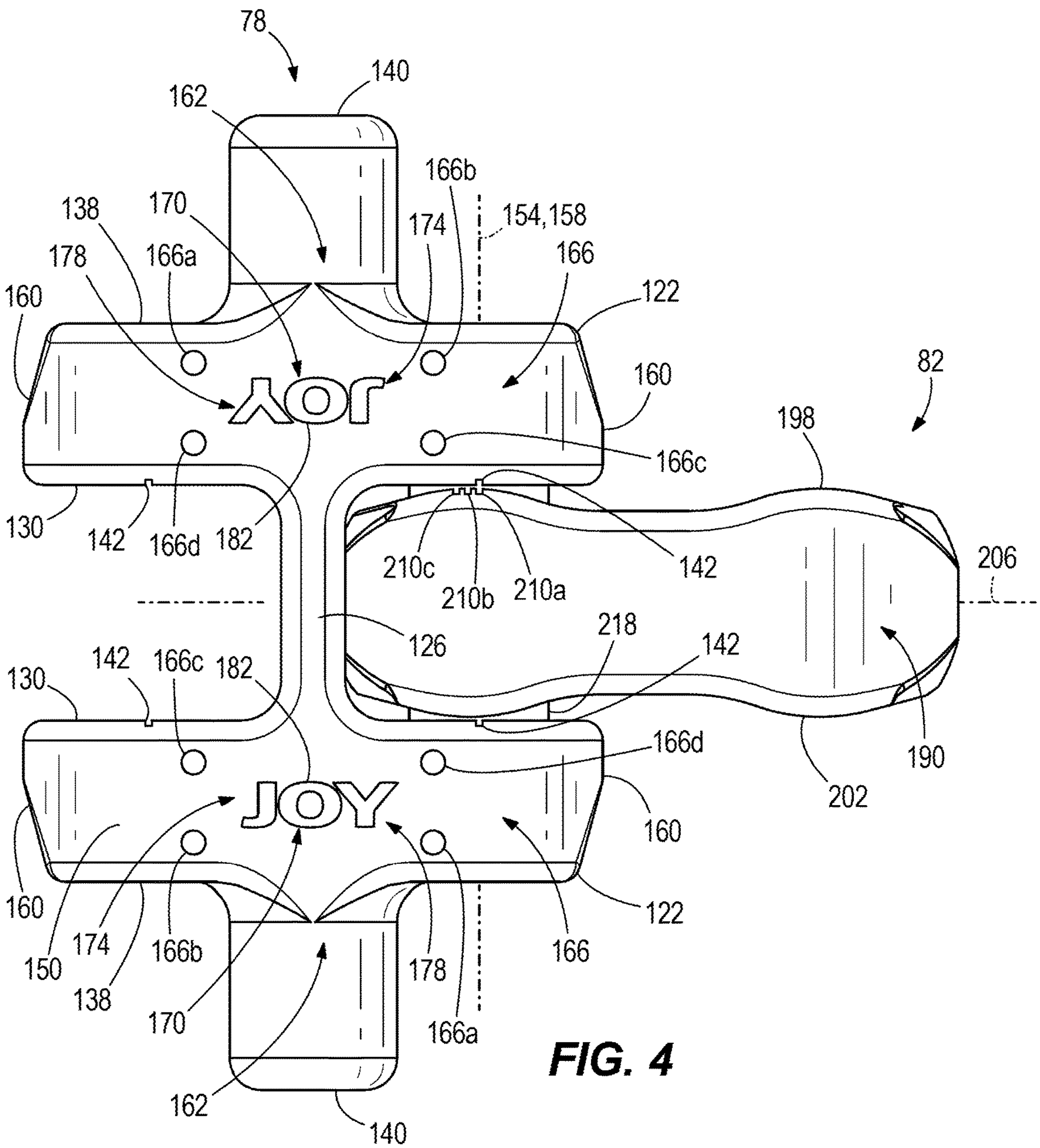
FIG. 4 is a plan view of a portion of the chain and flight linkage of FIG. 2.

Each side portion 122 of the connecting link 78 includes four link indicators 142 with two link indicators 142 positioned adjacent an upper surface 146 of the side portion 122 and two link indicators 142 positioned adjacent an lower surface 150 of the side portion 122 (only three of the four link indicators 142 of one side portion 122 are illustrated in FIG. 3). Accordingly, the connecting link 78 includes eight link indicators 142 in total. In another embodiment, the connecting link 78 can include more or less than eight link indicators 142. The illustrated link indicators 142 are positioned on each side portion 122 so that the bridge portion 126 is positioned between two opposing link indicators 142 in a direction parallel to the direction of travel 58. In the illustrated embodiment, the link indicators 142 are notches or channels formed in the inner surfaces 130. In other embodiments, each link indicator 142 can be a protrusion rather than a notch. With reference to FIG. 4, each illustrated link indicator 142 aligns with an opposing link indicator 142 in a plane 154 that is coplanar with a concentric axis 158 defined between opposing apertures 134. Stated another way, the plane 154 is substantially parallel to the bridge portion 126. In other embodiments, the plane 154 can be substantially parallel to the concentric axis 158 but offset relative to the concentric axis 158 (e.g., the plane 154 is positioned between the concentric axis 158 and the bridge portion 126 or the plane 154 is positioned between the concentric axis 158 and a distal surface 160 of the side portions 122 facing away from the bridge portion 126). In other embodiments, the link indicators 142 can be positioned adjacent one of the upper surface 146 and the lower surface 150 of each side portion 122 and/or formed in one of the side portions 122. In further embodiments, the link indicators 142 can be formed in any one of the flight link 74, the connecting link 78, and the swivel link 82.

With reference back to FIG. 3, the flight link 74 and the connecting link 78 include wear indicators 162 formed into corresponding side portions 90, 122. As the wear indicators 162 are the same between the flight link 74 and the connecting link 78, only the wear indicators 162 relative to the connecting link 78 will be described in detail below. However, the wear indicators 162 formed on the connecting link 78 can be equally applicable to the wear indicators 162 formed on the flight link 74.

Figure 5:
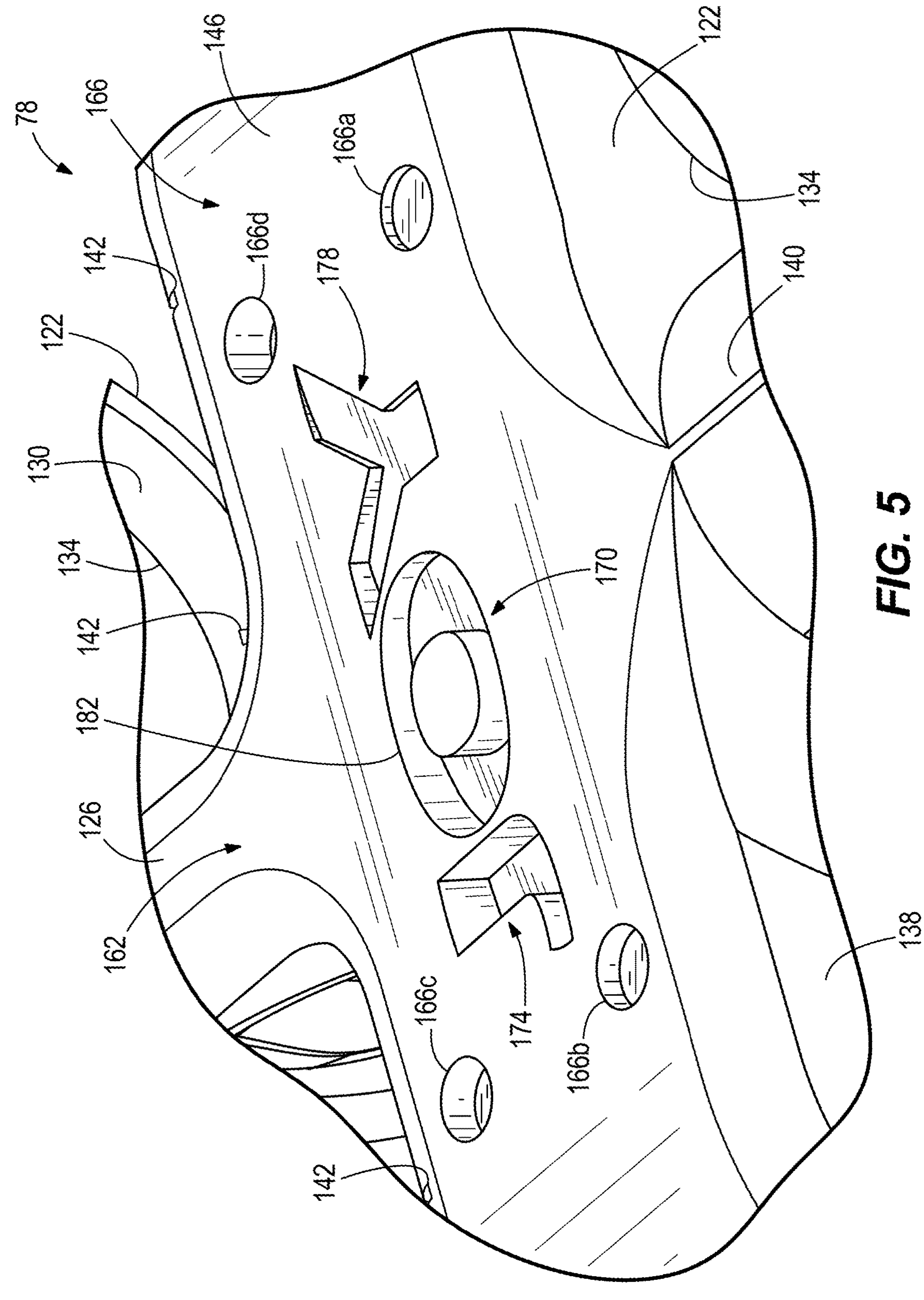
FIG. 5 is a detailed view of a portion of the chain and flight linkage of FIG. 2.

Each side portion 122 of the connecting link 78 includes one wear indicator 162 formed in the upper surface 146 (FIGS. 3 and 5) and one wear indicator formed in the lower surface 150 (not shown). In other embodiments, the wear indicators 162 can be formed in one of the upper surface 146 and the lower surface 150 of each side portion 122. In the illustrated embodiment, the wear indicators 162 include a plurality of indicator apertures 166 located between the two link indicators 142 in a direction perpendicular to the bridge portion 126 (FIG. 4). The indicator apertures 166 include first and second indicator apertures **166*a*, 166*b* formed on opposing sides of the bridge portion 126 and third and fourth indicator apertures 166*c*, 166*d* formed on opposing sides of the bridge portion 126 so that the first and fourth apertures 166*a*, 166*d* are located on one side of the bridge portion 126 and the second and third apertures 166*b*, 166*c* are located on the other side of the bridge portion 126 (FIG. 5). As such, the plurality of apertures 166 outline the shape of a rectangle. Each indicator aperture 166 defines a predetermined depth into the side portions 122. For example, the first indicator apertures 166*a* define a first depth, the second indicator apertures 166*b* define a second depth that is greater than the first depth, the third indicator apertures 166*c* define a third depth that is greater than the second depth, and the fourth indicator apertures 166*d* define a fourth depth that is greater than the third depth. In other embodiments, the plurality of apertures 166 can outline a different geometry (e.g., a trapezoid, etc.). In further embodiments, the plurality of indicator apertures 166** can include more or less than four apertures.

As best shown in FIG. 5, the wear indicators 162 may also include second indicators 170, such as graphic indicators (e.g., a brand name, trade name, image, logo, etc.). In the illustrated embodiment, each graphic indicator 170 includes a first side 174 positioned on one side of the bridge portion 126, a second side 178 positioned on the other side of the bridge portion 126, and a sloping aperture 182 extending between the first side 174 and second side 178. In the illustrated embodiment, the sloping aperture 182 is discontinuous between the sides 174, 178 and forms a plurality of letters, however, in other embodiments, the graphic indicators 170 can be formed as other characters, symbols, shapes, etc. Further, in other embodiments, the sloping aperture 182 can be continuous between the sides 174, 178 (e.g., a continuous sloping aperture). The illustrated first side 174 of the sloping aperture 182 includes a greater depth into the side portion 122 than the second side 178 of the sloping aperture 182 such that the sloping aperture 182 decreases in depth from the first side 174 to the second side 178. In the illustrated embodiment, the depth decreases in a linear manner. In other embodiments, the depth decreases in a nonlinear manner (e.g., quadratic manner, etc.)

In other embodiments, the connecting link 78 can include one wear indicator 162 (e.g., the plurality of indicator apertures 166 or the graphic indicator 170) formed on the upper surface 146 and/or the lower surface 150 of each side portion 122. In further embodiments, the connecting link 78 can include both the plurality of indicator apertures 166 and the graphic indicator 170 on the upper surface 146 and/or the lower surface 150 of each side portion 122. In yet further embodiments, the wear indicator 162 can be formed in at least one of the flight link 74, the connecting link 78, and the swivel link 82.

With reference back to FIGS. 3 and 4, the swivel link 82 includes a first or upper surface 186, a second or lower surface 190, and a pair of openings 194 extending laterally between a first side 198 of the swivel link 82 and a second side 202 of the swivel link 82. When the swivel link 82 is coupled to the connecting link 78 (FIG. 4), a portion of the first and second sides 198, 202 overlap with the inner surfaces 130 of the connecting link 78 in a direction transverse to the direction of travel 58. The swivel link 82 also defines a longitudinal axis 206 oriented generally parallel to the direction of travel 58 during operation. The longitudinal axis 206 generally extends between a first end and a second end of the link 82. The swivel link 82 also includes a series of swivel indicators 210 formed sequentially on the first side 198 adjacent the upper surface 186. In other embodiments, the swivel indicators 210 can also be formed sequentially on the first side 198 adjacent the lower surface 190. In further embodiments, the swivel indicators 210 can also be formed sequentially on the second side 202 adjacent the upper surface 186 and/or the lower surface 190. The illustrated swivel indicators 210 include three notches or channels 210*a*, 210*b*, 210*c* that open up to the inner surface 98, 130 of the flight link 74 or the connecting link 78, and one of the individual notches 210 can align with one link indicator 142 at a time. In other embodiments, the swivel indicators 210 can include more or less than three notches. In further embodiments, the series of indicators 210 can be formed in the flight link 74 and/or the connecting link 78 as the link indicator 142 is formed in the swivel link 82. In yet further embodiments, the swivel indicators 210 can be protrusions.

The swivel link 82 further includes a pair of spherical bearings 214 (FIG. 3), with each bearing 214 received in one of the openings 194. One of the openings 194 is aligned with parallel apertures 134 in the side portions 122 of the connecting link 78, while the other opening 194 is aligned with parallel apertures 102 in the side portions 90 of the flight link 74. A first connecting pin or first chain pin 218 is inserted through the apertures 134 of the connecting link side portions 122 and through one opening 194 of the swivel link 82, thereby coupling the swivel link 82 to the connecting link 78. Similarly, a second connecting pin or second chain pin 222 is inserted through the apertures 102 of the flight link side portions 90 and through the other opening 194 of the swivel link 82, thereby coupling the swivel link 82 to the flight link 74. Each chain pin 218, 222—and ultimately the flight link 74 and the connecting link 78—is supported for pivoting movement relative to the swivel link 82 by one of the spherical bearings 214.

In one embodiment, the first chain pin 218 is inserted through the connecting link side portions 122 in a first lateral direction, while the second chain pin 222 is inserted through the flight link side portions 90 in a second lateral direction opposite the first lateral direction. The chains pins 218, 222 are secured against axial movement relative to the connecting link 78 and the flight link 74 by retainers (not shown).

When the machine 10 is assembled and before the conveyor 42 operates under load, at least one link indicator 142 of the connecting link 78 aligns with the first notch 210*a* formed on the swivel link 82 (FIG. 4). In addition, the wear indicators 162 are at a maximum (e.g., original) depth.

During a cutting operation for the machine 10 illustrated in FIG. 1, the cutter head 26 dislodges material from the mine, the material drops onto a floor near the gathering head 34, and the material is directed onto the deck 50 and then onto the conveyor 42 by the rotating arms 54. At the same time, the shaft 62 drives the conveyor 42 in the direction of travel 58 for the flight bars 86 to push the material along the conveyor surface 68 in the same direction. Driving the material toward the rear end 46 creates a tension force on the chain 70. In particular, at least the swivel link 82 is pulled in the direction of travel 58 (e.g., parallel to the longitudinal axis 206 of the swivel link 82). It is advantageous to monitor how much the swivel link 82 elongates or stretches (e.g., a wear condition) during operation of the machine 10 so that an operator can change the swivel links 82 before the swivel links 82 stretch beyond a permissible length and/or break.

Figure 6:
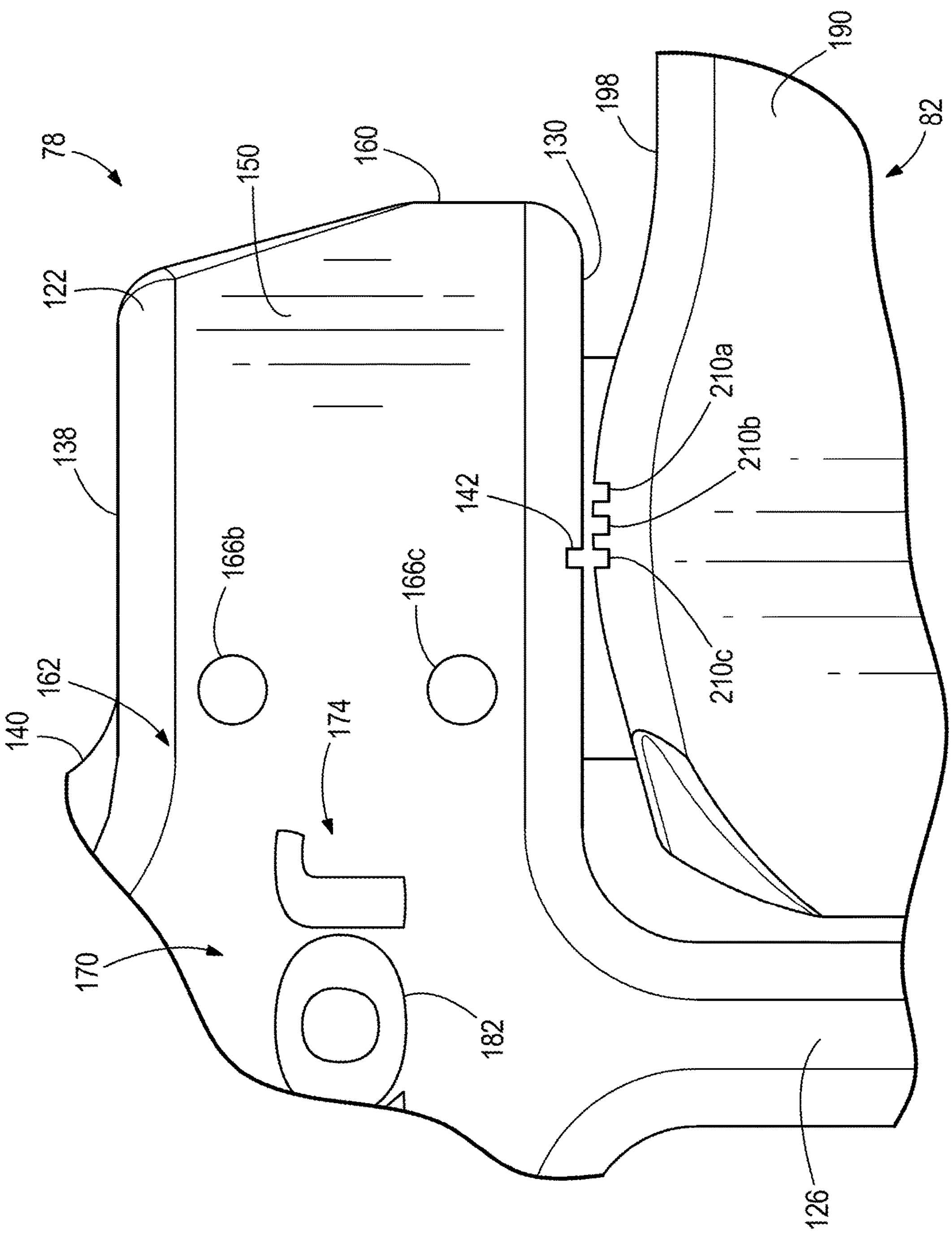
FIG. 6 is a detailed view of the chain and flight linkage of FIG. 4 illustrating a stretched condition of the chain and flight linkage.

Therefore, as the operation life of the conveyor 42 increases, the swivel link 82 may stretch and deform so that the series of swivel indicators 210 will move relative to the link indicator 142. Depending on which notch 210*a*, 210*b*, 210*c* the link indicator 142 aligns with, the operator can visually monitor the wear and remaining service life of the swivel link 82 without needing to provide direct contact with the chain 70. The notches 210 and link indicator 142 provide graduations that permit an observer to quantifiably measure the elongation of the swivel link 82. For example, in one embodiment, when the link indicator 142 aligns with the first notch 210*a*, the life of the swivel link 82 can be approximately 100%. When the swivel link 82 stretches during operation so that the link indicator 142 aligns with the second notch 210*b*, the life of the swivel link 82 can be approximately 50%. When the swivel link 82 stretches some more during operation so that the link indicator 142 aligns with the third notch 210*c* (FIG. 6), the life of the swivel link 82 can be almost finished indicating to the operator that the swivel link 82 needs to be replaced with a new swivel link 82. In other embodiments, the swivel indicator 210 can only include one notch 210*c* indicating to the operator that the swivel link 82 needs to be replaced once the link indicator 142 aligns with the notch 210*c*.

In other embodiments, the alignment of the link indicator 142 and the series of swivel indicators 210 can represent different life percentages to the operator. For example, when the link indicator 142 aligns with the second notch 210*b*, the life of the swivel link 82 can be greater than 50%, and when the link indicator 142 aligns with the third notch 210*c*, the life of the swivel link 82 can be less than 50% indicating to the operator that the swivel link 82 needs to be replaced with a new swivel link 82.

Figure 7:
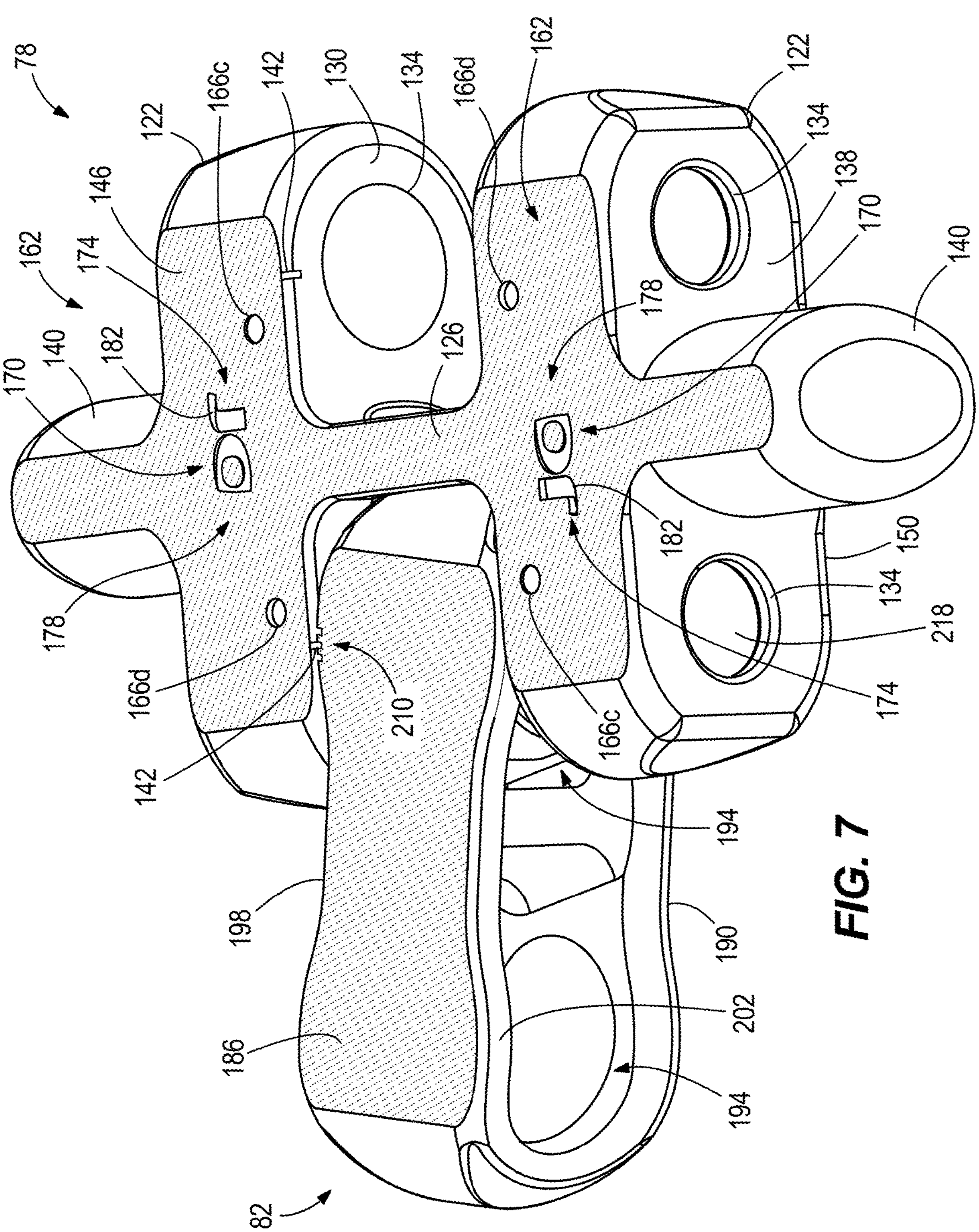
FIG. 7 is a perspective view of a portion of the chain and flight linkage of FIG. 2 illustrating wear on the chain and flight linkage.

As shown in FIG. 7, the illustrated connecting links 78 also wear during operation of the machine 10. For example, the connecting links 78 can decrease in thickness (i.e., a distance between the upper surface 146 and the lower surface 150) during use. The upper surface 146 of the connecting links 78 can wear due to the material falling onto the chain 70 and/or the material moving relative to the chain 70 as the conveyor 42 moves the material along the conveyor surface 68. The lower surface 150 of the connecting links 78 can also wear due to the chain 70 being forced against the conveyor surface 68 by the weight of the material being moved by the conveyor 42. Therefore, it is also advantageous to monitor the wear on the connecting links 78 (e.g., a wear condition) during operation of the machine 10 so that an operator can change the connecting links 78 before the connecting links 78 wear beyond a permissible level and/or break. As the operation life of the machine 10 increases, the connecting link 78 will wear down and material from both the upper and lower surfaces 146, 150 will be removed. As material is removed from the connecting link 78, the wear indicator 162 will visually represent the remaining life of the connecting link 78 to the operator. The apertures 166 and graphic indicators 170 provide graduations or graduated indications that permit an observer to quantifiably measure the wear on the connecting link 78.

With respect to the plurality of indicator apertures 166, the visibility of a particular indicator aperture 166 can identify the remaining life of the connecting link 78. In one embodiment, if the first aperture **166*a* is visible, the life of the connecting link 78 is greater than 75%. If the connecting link 78 begins to wear such that the first aperture 166*a* disappears but the second aperture 166*b* is still visible, the life of the connecting link 78 is less than 75% but greater than 50%. If the connecting link 78 continues to wear such that the second aperture 166*b* disappears but the third aperture 166*c* is still visible, the life of the connecting link 78 is less than 50% but greater than 25% (FIG. 7). If the connecting link 78 further wears such that the third aperture 166*c* disappears but the fourth aperture 166*d* is still visible, the life of the connecting link 78 is less than 25% and greater than 0%. Finally, if the connecting link 78 wears so that the fourth aperture 166*d* disappears, the operator will know that the connecting link 78 needs to be replaced with a new connecting link 78. In other embodiments, each of the indicator apertures 166 can represent different levels of remaining life to the operator. For example, the fourth aperture 166*d* can indicate to the operator that the connecting link 78 needs to be replaced before the fourth aperture 166*d*** disappears.

The graphic indicators 170 function in a similar manner to the plurality of indicator apertures 166 to represent the remaining life of the connecting link 78. With continued reference to FIG. 7, the sloped aperture 182 progressively disappears as the connecting link 78 wears. In particular, if the life of the connecting link 78 is at or near 100%, then all or most of the sloped aperture 182 will be visible to the operator. However, if the life of the connecting link 78 is at or near 0%, then all or most of the sloped aperture 182 will not be visible to the operator. Therefore, as the wear on the connecting link 78 increases, the sloped aperture 182 starts to disappear from the second side 178 and progressively disappears toward the first side 174. In further embodiments, indicia (e.g., slots) can be positioned adjacent the graphic indicators 170 to signify a percent wear of the connecting link 78 as the sloped aperture 182 progressively disappears and aligns with different indicia.

In addition, because the main components of the chain 70 (the flight link 74, the connecting link 78, the swivel link 82, and the flight bars 86) are symmetric about a horizontal plane (i.e., the upper portions of the chain 70 components is symmetric with respect to the lower portions), the chain 70 can be uninstalled and reversed so that the upper surfaces are positioned adjacent the conveyor surface 68. Reversing or rotating the chain 70 in this manner increases the service life of the chain 70. In some embodiments, the disappearance of all or a portion of the indicator apertures 166 and/or the graphic indicator 170 can signify to an operator that the chain 70 should be rotated to facilitate even wear between the upper surface and the lower surface.

Figure 8:
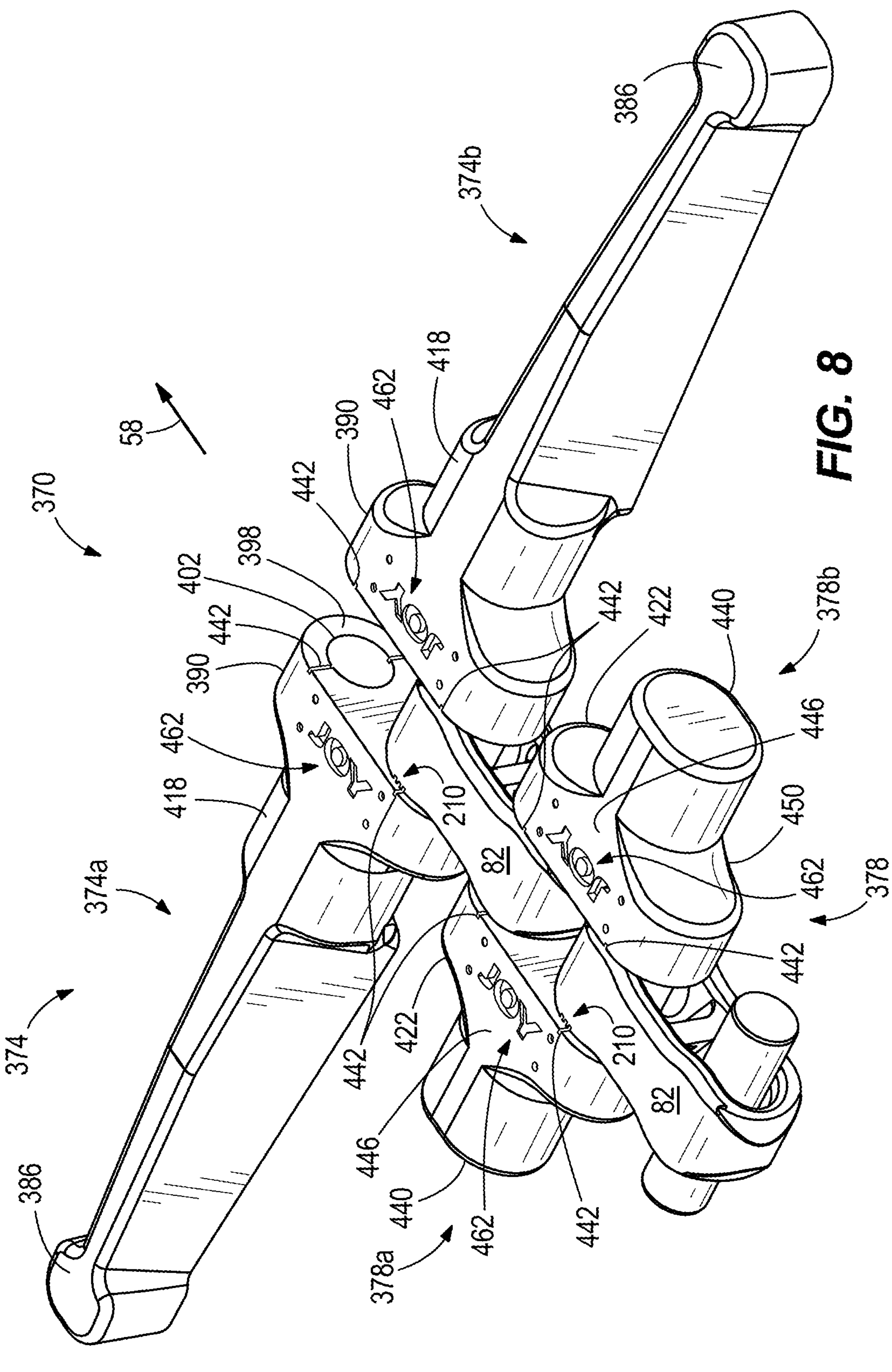
FIG. 8 is a perspective view of a portion of a chain and flight linkage according to another embodiment of the disclosure.
Figure 9:
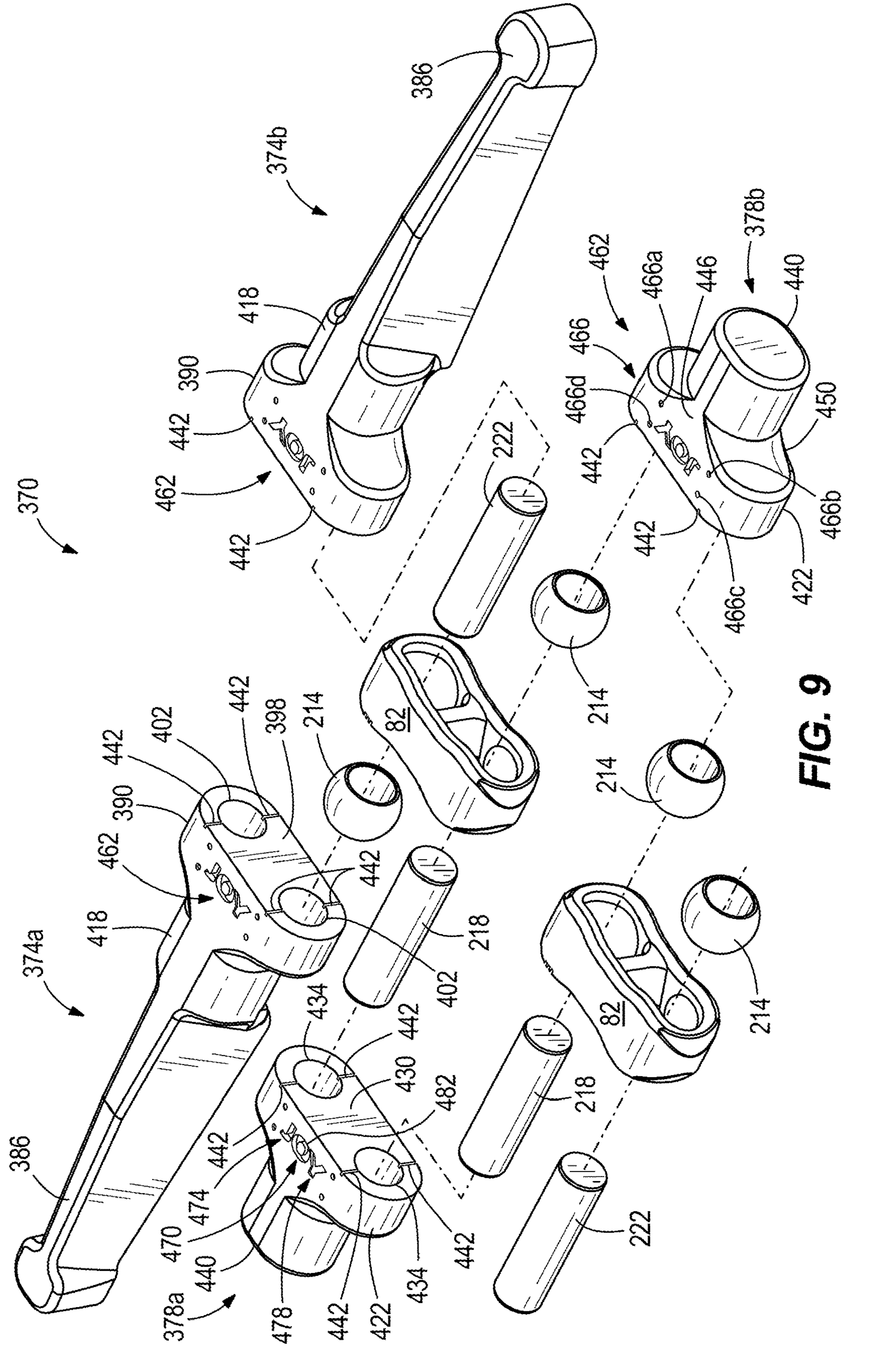
FIG. 9 is an exploded view of the portion of the chain and flight linkage of FIG. 8.

FIGS. 8 and 9 illustrate a chain 370 that can form a portion of the conveyor 42 according to another embodiment. The chain 370 is similar to the chain 70; therefore, similar components are designated with similar references numbers plus 300. At least some differences and/or at least some similarities between the chains 70, 370 will be discussed in detail below. In addition, components or features described with respect to only one or some of the embodiments described herein are equally applicable to any other embodiments described herein.

The illustrated chain 370 includes a flight link 374 including a pair of portions (a first flight link portion **374*a* and a second flight link portion 374*b*) and a connecting link 378 including a pair of portions (a first connecting link portion 378*a* and a second connecting link portion 378*b*). A swivel link 82 couples the flight link 374 to the connecting link 78. The connecting link portions 378*a*, 378*b* are separate from one another and not directly connected. Rather, the connecting link portions 378*a*, 378*b* are coupled to one another by chain pins 218 (FIG. 9) extending between the connecting link portions 378*a*, 378*b* and through the swivel link 82. Stated another way, no bridge is provided between the connecting link portions 378*a*, 378*b*. Likewise, the flight link portions 374*a*, 374*b* are separate from one another and not directly connected; no bridge is provided between the flight link portions 374*a*, 374*b*. Rather, the flight link portions 374*a*, 374*b* are coupled to one another by chain pins 222 (FIG. 9) extending between the flight link portions 374*a*, 374*b* and through the swivel link 82. In the illustrated embodiment, each flight bar 386 is formed integrally with one of the flight link portions 374*a*, 374*b***.

Each flight link portion **374*a*, 374*b* includes a body 390 having a pair of apertures 402 formed on an inner side surface 398 of the body 390. The flight bar 386 extends from an end of a drive portion 418 of the associated flight link portion 374*a*, 374*b*. In addition, each connecting link portion 378*a*, 378*b* includes a body 422 defining an upper surface 446 and a lower surface 450 and having a pair of apertures 434 formed on an inner side surface 430 of the body 422. Each connecting link portion 378*a*, 378*b* also includes a drive pin 440 extending outwardly from an outer surface 438 of the body 422**.

Each body 390, 422 also includes link indicators 442, wear indicators 462 having indicator apertures 466 (e.g., apertures **466*a*, 466*b*, 466*c*, 466*d*), and graphic indicators 470. Each graphic indicator 470 includes a first side 474, a second side 478, and a sloping aperture 482 extending between the sides 474, 478**.

Although the conveyor is described above with respect to a continuous mining machine, it is understood that the conveyor can be incorporated into other types of mining machines including but not limited to roadheaders, longwall mining machines, and entry drivers, as well as loading and hauling machines including but not limited to shuttle cars, battery haulers, or other types.

Although aspects have been described in detail with reference to certain preferred embodiments, variations and modifications exist within the scope and spirit of one or more independent aspects as described. Various features and advantages of the disclosure are set forth in the following claims.

The invention claimed is:

1. A link assembly for moving material in a direction of movement from a first end of a conveyor toward a second end of the conveyor, the link assembly comprising:

a first link including a first side edge positioned between a first end and a second end of the first link, the first link including a first indicator; and a second link including a second side edge extending between a first end and a second end of the second link, the second link including a second indicator, the second link coupled to the first link such that the first side edge of the first link overlaps with the second side edge of the second link in a direction transverse to the direction of movement, elongation of the first link in the direction of movement causes the first indicator to move relative to the second indicator, and a position of the first indicator relative to the second indicator providing an indication of a wear condition of the first link.

2. The link assembly of claim 1, wherein the first indicator is a first notch formed into the first side edge of the first link.

3. The link assembly of claim 2, wherein the second indicator is a second notch formed into the second side edge of the second link.

4. The link assembly of claim 1, wherein, when the first indicator is in a predetermined positioned relative to the second indicator, the first link is in condition for replacement.

5. The link assembly of claim 1, wherein the first link includes a plurality of first indicators positioned on the first side edge, and wherein alignment of the second indicator with each one of the plurality of first indicators represents a different wear condition of the first link.

6. The link assembly of claim 1, wherein the second link includes a first protrusion extending away from an outer side surface of the second link, and wherein the first protrusion is configured to engage a drive sprocket for moving the linkage in the direction of movement.

7. The link assembly of claim 6, further comprising a third link coupled to the first link opposite the second link, wherein the third link includes a second protrusion extending away from an outer side surface of the third link, and wherein the second protrusion is configured to engage the drive sprocket.

8. The link assembly of claim 6, wherein the second link includes a flight positioned adjacent an end of the first protrusion, the flight configured to push the material as the linkage moves from the first end of the conveyor toward the second end of the conveyor.

9. The link assembly of claim 1, wherein the second link includes a first side portion and a second side portion, the first side portion including a first protrusion, the second side portion including a second protrusion, the first protrusion and the second protrusion extending laterally away from one another, wherein the first link is positioned between the first side portion and the second side portion.

10. The link assembly of claim 9, wherein the first side portion and the second side portion are integrally formed with one another.

11. The link assembly of claim 1, wherein the second link includes a wear indicator formed in at least one of an upper surface and a lower surface of the second link, and wherein the wear indicator is configured to represent a second wear condition of the one of the upper surface and the lower surface.

12. A linkage for moving material in a direction from a first end of a conveyor toward a second end of the conveyor, the linkage comprising:

a link including a first surface and a second surface opposite the first surface, the second surface configured to slide relative to a support surface of the conveyor as the linkage moves from the first end of the conveyor toward the second end of the conveyor, at least one of the first surface and the second surface including a wear indicator representing a surface wear condition of the at least one of the first surface and second surface;

wherein the wear indicator includes an aperture having a bottom recessed surface, the bottom recessed surface oriented at an oblique angle relative to the one of the first surface and the second surface, the bottom recessed surface having a first depth adjacent a first side of the aperture and a second depth adjacent a second side of the aperture opposite the first side, the second depth greater than the first depth, the aperture incrementally becoming less visible as the one of the first surface and the second surface is worn.

13. The linkage of claim 12, wherein, when the aperture disappears from the one of the first surface and the second surface, the link is in condition for replacement.

14. The linkage of claim 12, wherein the aperture is a first aperture, wherein the wear indicator also includes a plurality of second apertures separate from the first aperture, wherein each aperture of the plurality of second apertures has an initial predetermined depth in the one of the first surface and the second surface, and wherein the plurality of second apertures indicates an extent of surface wear as each of the plurality of second apertures disappears from the one of the first surface and the second surface.

15. The linkage of claim 12, wherein the aperture includes a plurality of discrete apertures aligned between the first end and the second end.

16. The linkage of claim 12, wherein the link includes a first protrusion extending away from an outer side surface of the link, and wherein the first protrusion is configured to engage a drive sprocket for moving the linkage in the direction of movement.

17. The linkage of claim 16, wherein the link is a first link, and wherein the linkage further comprises a second link coupled to the first link, and a third link coupled to the second link opposite the first link, wherein the third link includes a second protrusion extending away from an outer side surface of the third link, and wherein the second protrusion is configured to engage the drive sprocket.

18. The linkage of claim 17, wherein the third link includes a flight positioned adjacent an end of the second protrusion, the flight configured to push the material as the linkage moves from the first end of the conveyor toward the second end of the conveyor.

19. The linkage of claim 12, wherein the link includes a first side portion and a second side portion, the first side portion including a first protrusion, the second side portion including a second protrusion, the first protrusion and the second protrusion extending laterally away from one another, the first side portion and the second portion being integrally formed with one another.

20. The linkage of claim 12, wherein the link includes a first side portion and a second side portion, the first side portion including a first protrusion, the second side portion including a second protrusion, the first protrusion and the second protrusion extending laterally away from one another, the first side portion and the second portion being separate from one another.

21. The linkage of claim 12, wherein the bottom recessed surface becomes less visible in a manner proportional to the wear on the one of the first surface and the second surface.

* * * * *